Feb. 29, 1944.   N. J. ZERANGUE   2,342,779
WAR PLANE
Filed Oct. 14, 1941   5 Sheets-Sheet 2
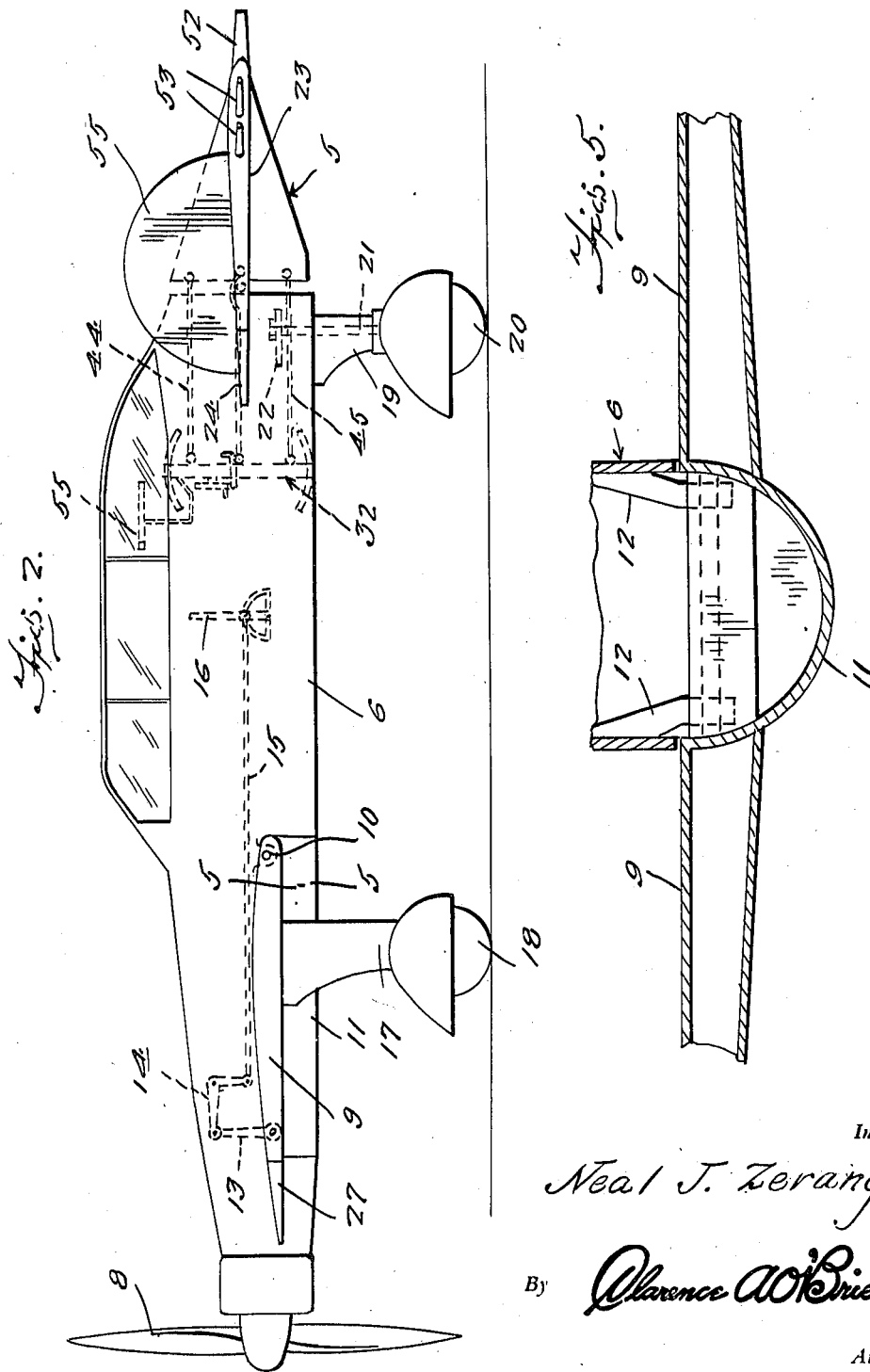
Inventor
Neal J. Zerangue
By Clarence A. O'Brien
Attorney

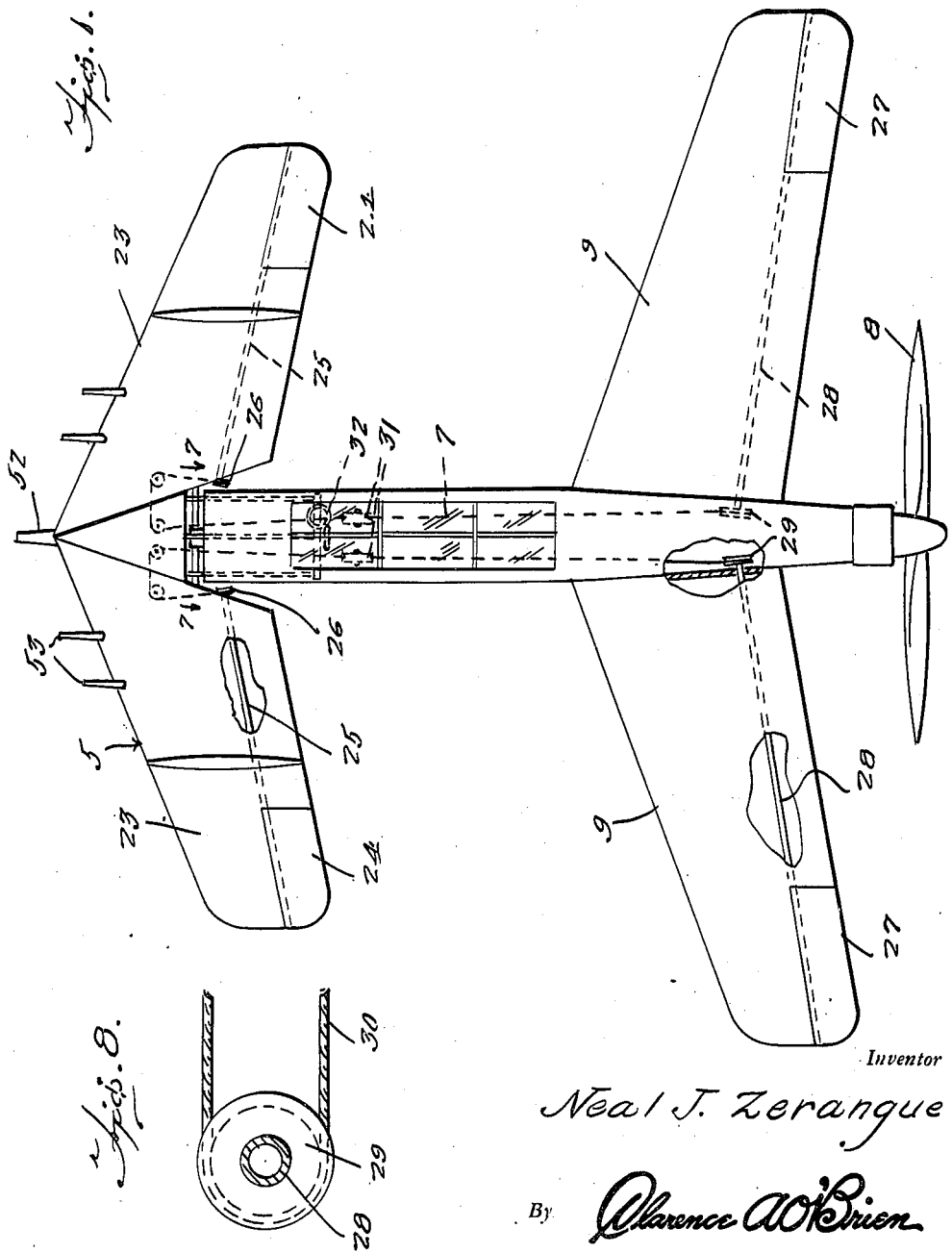

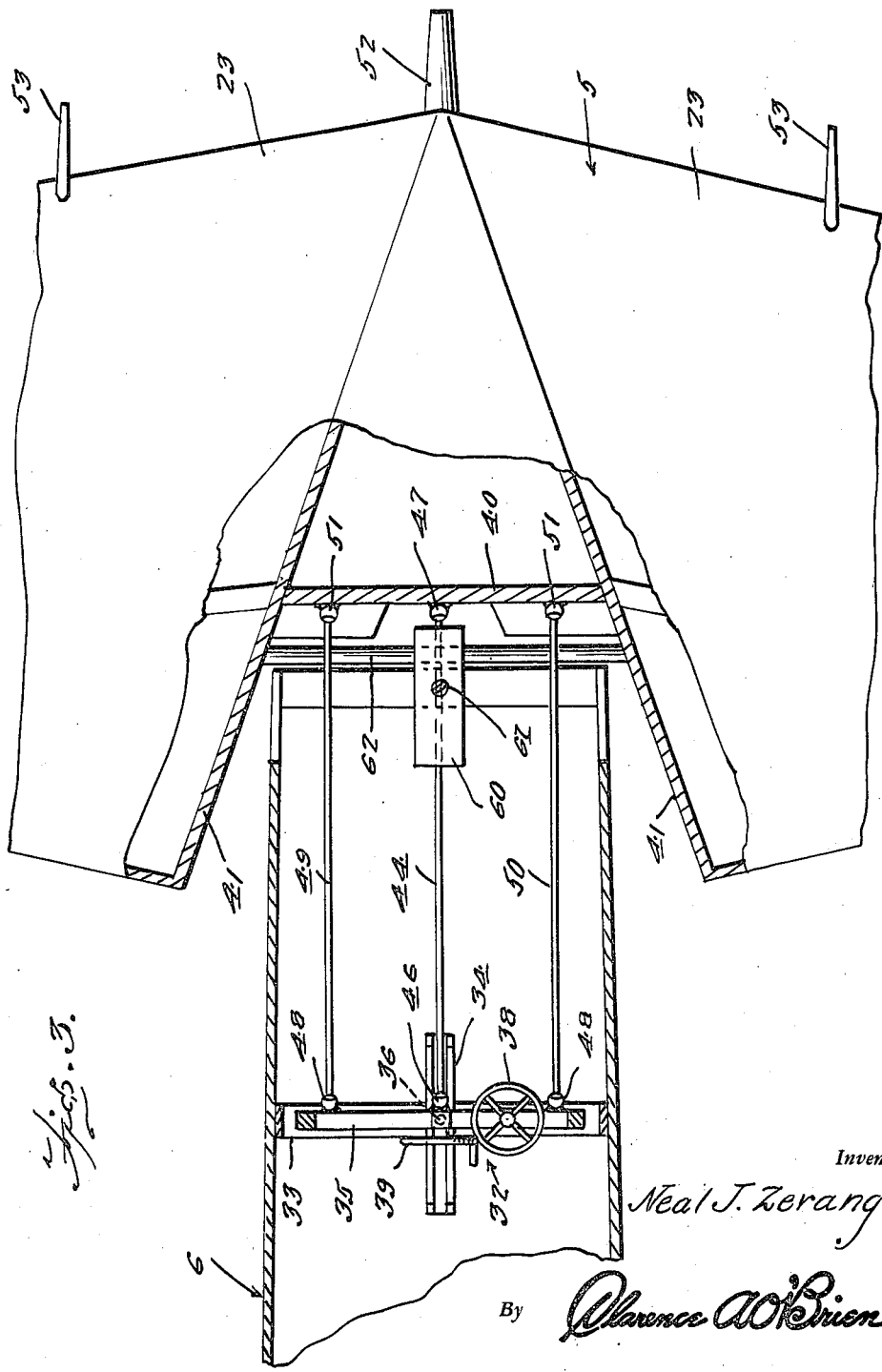

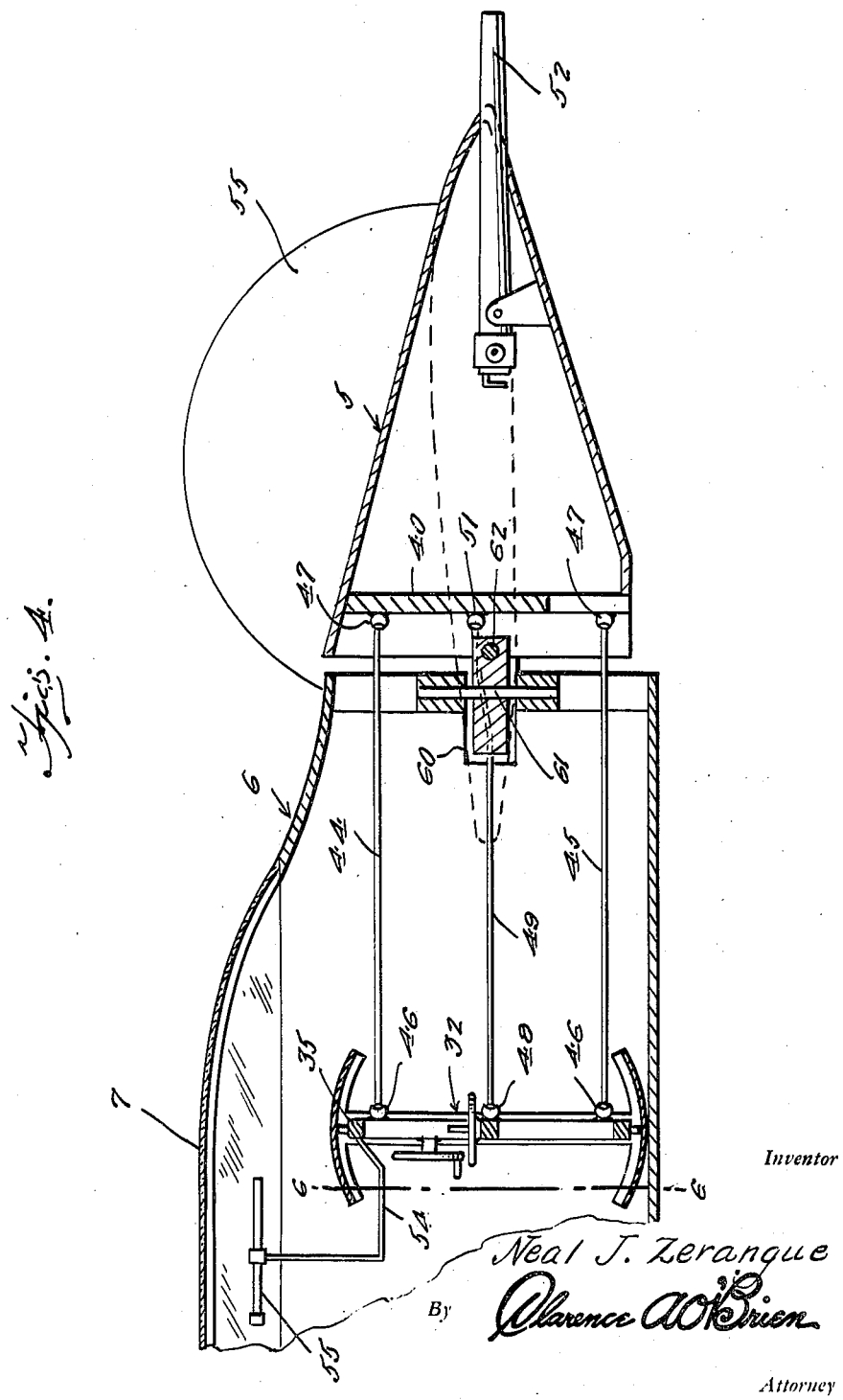

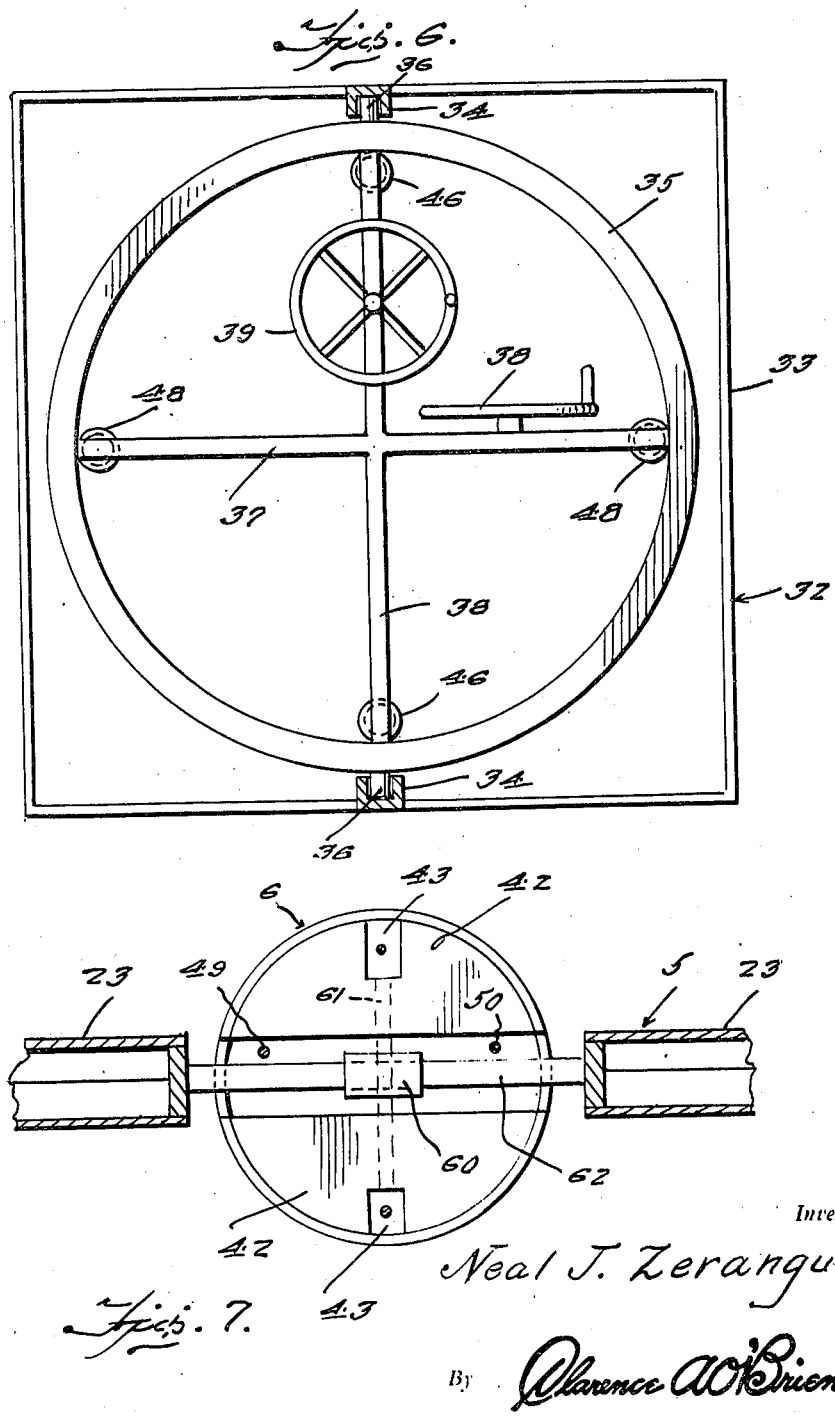

Patented Feb. 29, 1944

2,342,779

UNITED STATES PATENT OFFICE 2,342,779

WARPLANE

Neal J. Zerangue, New Orleans, La.

Application October 14, 1941, Serial No. 414,941

2 Claims. (Cl. 244—83)

This invention relates to new and useful improvements in aeronautics and more particularly to an improved fighter plane.

The principal object of the present invention is to provide a plane employing the "pusher" principle of propulsion.

Another important object of the invention is to provide an aircraft of the combat type wherein a forward section of the plane is directionally controllable to the end that the entire plane will take the course defined by a line on which the main armament is sighted.

Other objects and advantages of the invention will become apparent to the reader of the following description.

In the drawings:

Figure 1 represents a top plan view with a portion broken away.

Figure 2 is a side elevational view.

Figure 3 is a top plan view and horizontal section showing how the front wing assembly is jointed to the fuselage.

Figure 4 is a longitudinal sectional view vertically through the structure shown in Figure 3.

Figure 5 is an enlarged detailed sectional view taken substantially on line 5—5 of Figure 4.

Figure 6 is a sectional view taken substantially on line 6—6 of Figure 4.

Figure 7 is a sectional view taken substantially on line 7—7 of Figure 4.

Figure 8 is a sectional view taken substantially on line 8—8 of Figure 1.

Referring to the drawings wherein like numerals designate like parts, it can be seen that numeral 5 generally refers to the forward wing section of the aircraft, this being universally connected to the fuselage, the latter being generally referred to by numeral 6. The fuselage 6 has a raised windowed cabin dome 7.

Numeral 8 denotes a propeller, this being located at the tail of the fuselage and in operation acts as a "pusher" for the aircraft.

At both sides of the tail portion of the fuselage 6 are wings 9. These wings 9 are connected by shafts 10 extending through the tail portion of the fuselage and also by a section 11 of the lower portion of the fuselage 6. Brackets 12, 12 are provided in the fuselage for supporting the shafts 10 and the wings. One or both of the wings 9 may have a link member 13 extending to a bell crank 14, which in turn is connected to a rod or cable line 15 extending to a control lever 16. Under some conditions the wings 9 may be used in flight, but the adjustability of these wings is preferably restricted to use in landing.

Streamlined legs 17 depend from the wings 9 and carry ground riding wheels 18.

A single leg 19 depends from the forward portion of the fuselage 6 and is suitably streamlined. A wheel 20 is at the lower end of this leg and a control or steering shaft 21 extends upwardly from this wheel 20 to a steering wheel or the like 22 located in the forward end portion of the fuselage 6.

The steerable section 5 at the forward end of the fuselage has its wing structures 23, 23 equipped with ailerons 24, 24 and from these extend shafts 25, 25 provided with pulleys 26 at their inner ends.

The wings 9, 9 are equipped with ailerons 27, 27 having a shaft 28 extending therefrom and equipped with pulleys 29 at their inner ends.

Cables 30 extend over these pulleys 26 and 29 and to suitable foot pedals or the like 31. Thus, the ailerons may be efficiently controlled.

The means for steering the front section 5 of the aircraft is generally referred to by numeral 32 and is clearly shown in Figures 3, 4, 6 and 7.

As shown in Figure 6, the control means 32 consists of a frame 33, preferably of square shape and having upper and lower arcuate-shaped channeled guides 34, 34 suitably mounted thereon, these guides extending longitudinally of the ship.

Within the confines of the frame 33 is an annulus 35 having upwardly and downwardly disposed trunnions 36 which are disposed in the channeled guides 34, 34. The annulus 35 mounted in this manner is free to oscillate on a horizontal axis with its trunnions 36 riding the guides 34, or to be oscillated on a vertical axis in which instance the trunnions 36, 36 would be on the axial line.

Horizontal and vertical cross-bars 37, 38 are provided in the annulus 35 and carry wheel-shaped hand engageable structures 38, 39 which are used in facilitating operation of the annulus.

Attention is now directed to Figure 4 wherein a wall 40 can be seen in the forward portion of the cut-out part 41 of the steerable section 5 into which the forward end portion of the fuselage 6 fits. As shown in Figure 7, the forward end portion of the fuselage 6 has a pair of vertically spaced substantially half-disc wall sections 42, 42 in which are upper and lower openings 43, 43 through which control rods 44, 45 extend. The control rods 44, 45 are connected by ball and socket joints 46 to the upper and lower ends, respectively, of the vertical cross-member 38 of the annulus 35, the same extending forwardly through the openings 43 to connect the upper and lower portions of the wall 40 of the plane section 5 by ball and socket joints 47, 47.

Connected to the ends of the cross-member 37 by ball and socket joints 48 are rods 49, 50 which extend through the space between the wall sections 42, 42 and connect to horizontally spaced portions of the wall 40 by ball and socket connections 51.

Obviously, the forward section 5 of the aircraft will be moved or steered in a direction corresponding to the positioning of the annulus 35.

A cannon of high calibre machine gun 52 is mounted in the extreme forward portion of the section 5 and also rearmament 53 may be spaced off laterally from this piece 52.

An arm or bracket 54 extends rearwardly and upwardly from the uppermost portion of the annulus 35 and supports a sight 55.

In the operation of the machine, it can be seen that not only is the ship steered toward the objective, but the ship is actually controlled coordinately with the aiming of the gun 52. In other words, aiming of gun 52 and steering of the ship are coincident. A form of universal connection is provided between the nose 5 and fuselage 6, and comprises a block 60 vertically through which a pin 61 is disposed. A horizontal pin or shaft 62 on the nose 5 passes through the forward end of the block 60.

Vertical fins 55 may be provided on the wings 23, 23.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An aircraft of the character described comprising a forward wing provided steerable section, a fuselage, steering means for the section operative in the fuselage, said steering means consisting of a frame having upper and lower channeled guides, an annulus disposed in the frame and provided with upwardly and downwardly extending trunnions disposed in the guides, and control lines extending from the annulus at circumferentially spaced intervals and being connected to the said steerable section.

2. In an airplane, a fuselage, a forward steerable wing provided section mounted on said fuselage for swinging movement about right angularly related axes, and steering means for swinging said section comprising a vertical frame fixed in the fuselage, an annulus, means to mount the annulus in the plane for sliding tilting movement therein about a horizontal axis and for swinging about an axis at a right angle to said horizontal axis, and rods universally connected to the annulus at 90 degree intervals and similarly connected to said section.

NEAL J. ZERANGUE.